United States Patent
Castillo et al.

(10) Patent No.: US 9,862,429 B2
(45) Date of Patent: Jan. 9, 2018

(54) OPEN BED TAILGATE EXTENSION

(71) Applicant: Hyundai Motor America, Fountain Valley, CA (US)

(72) Inventors: Gilbert Castillo, Costa Mesa, CA (US); Daniel Han, Fountain Valley, CA (US); Mark Dipko, Fountain Valley, CA (US); Matthew Michael O'Brien, Hermosa Beach, CA (US); Matthew Tindall, San Pedro, CA (US)

(73) Assignee: Hyundai Motor America, Fountain Valley, CA (US)

( * ) Notice: Subject to any disclaimer, the term of this patent is extended or adjusted under 35 U.S.C. 154(b) by 0 days.

(21) Appl. No.: 14/981,507

(22) Filed: Dec. 28, 2015

(65) Prior Publication Data

US 2016/0185396 A1   Jun. 30, 2016

Related U.S. Application Data

(60) Provisional application No. 62/097,999, filed on Dec. 30, 2014.

(51) Int. Cl.
*B62D 33/027* (2006.01)
*B62D 33/03* (2006.01)

(52) U.S. Cl.
CPC ......... *B62D 33/0273* (2013.01); *B62D 33/03* (2013.01)

(58) Field of Classification Search
CPC ........................... B62D 33/0273; B62D 33/03
USPC ........ 296/26.01, 26.08–26.11, 50, 57.1, 37.6
See application file for complete search history.

(56) References Cited

U.S. PATENT DOCUMENTS

| | | | | |
|---|---|---|---|---|
| 3,004,790 A * | 10/1961 | Mayer | ..................... | B60R 5/041 296/26.09 |
| 3,695,666 A * | 10/1972 | Corson | ................... | B60R 19/56 293/117 |
| 4,813,842 A * | 3/1989 | Morton | ................... | A01D 90/00 292/DIG. 29 |
| 5,277,275 A * | 1/1994 | Ablabutyan | .......... | B60P 1/4414 187/272 |
| 5,641,262 A * | 6/1997 | Dunlop | ................. | B60P 1/4414 254/10 R |
| 5,673,960 A * | 10/1997 | Sorensen | .............. | B60P 1/4492 280/770 |
| 6,293,602 B1 * | 9/2001 | Presley | .............. | B62D 33/0273 296/146.8 |
| 6,367,858 B1 * | 4/2002 | Bradford | ................... | B60P 3/40 296/26.09 |
| 6,540,278 B2 * | 4/2003 | Presley | .............. | B62D 33/0273 296/106 |
| 7,021,689 B1 * | 4/2006 | Weisbeck, III | .... | B62D 33/0273 296/26.11 |

(Continued)

*Primary Examiner* — Gregory Blankenship
(74) *Attorney, Agent, or Firm* — Smyrski Law Group, A.P.C.

(57) ABSTRACT

An extending tailgate arrangement is provided. The arrangement includes a tailgate and a linkage configured to extend the tailgate away from a rear end of a vehicle by a predetermined distance such that the tailgate contacts the linkage and does not contact the vehicle. The tailgate may be alternately opened in a conventional flip-down manner, and a sliding plate may be provided that covers the gap formed by the extending tailgate arrangement. In certain embodiments, a fence is employed with the tailgate arrangement to enclose the area formed.

24 Claims, 12 Drawing Sheets

(56) References Cited

U.S. PATENT DOCUMENTS

| | | | | |
|---|---|---|---|---|
| 7,354,090 | B1* | 4/2008 | Pomorski | B60N 2/005 |
| | | | | 296/26.11 |
| 8,109,552 | B2* | 2/2012 | Nelson | B62D 33/0273 |
| | | | | 224/403 |
| 8,844,996 | B2* | 9/2014 | Garchar | B62D 33/0273 |
| | | | | 296/26.09 |
| 2004/0183326 | A1* | 9/2004 | Tegtmeier | B62D 33/0273 |
| | | | | 296/62 |
| 2004/0251698 | A1 | 12/2004 | Welch | |
| 2005/0073167 | A1* | 4/2005 | De Gaillard | B60J 5/106 |
| | | | | 296/76 |
| 2006/0125270 | A1* | 6/2006 | Madlinger | B62D 33/03 |
| | | | | 296/57.1 |
| 2007/0075560 | A1* | 4/2007 | Katterloher | B62D 33/03 |
| | | | | 296/50 |
| 2007/0236034 | A1* | 10/2007 | Stewart | B60P 3/40 |
| | | | | 296/26.1 |
| 2007/0236035 | A1* | 10/2007 | Waldner | B62D 33/02 |
| | | | | 296/26.11 |
| 2008/0145200 | A1 | 6/2008 | Hagenbuch | |
| 2008/0196314 | A1 | 8/2008 | Stratten | |
| 2008/0211254 | A1* | 9/2008 | Maier | B60P 1/4471 |
| | | | | 296/57.1 |
| 2009/0079217 | A1 | 3/2009 | Bakshi | |
| 2009/0243329 | A1* | 10/2009 | Hustyi | B60J 1/1846 |
| | | | | 296/76 |
| 2009/0243342 | A1 | 10/2009 | Christensen | |

\* cited by examiner

OPEN BED TAILGATE EXTENSION

This application claims priority based on U.S. Provisional Patent Application Ser. No. 62/097,999, entitled "Open Bed Tailgate Extension," inventors Gilbert Castillo, et al., filed Dec. 30, 2014, the entirety of which is incorporated herein by reference.

BACKGROUND

I. Field

The present application relates generally to the art of automotive vehicles, and more specifically to extensions for automotive vehicle beds, including pickup truck beds employing a rear door or gate such as a tailgate.

II. Description of the Related Art

Certain popular automotive vehicles provide flat beds at or near the rear of the vehicle, typically enclosed by side panels and a tailgate. Pickup trucks are the most common consumer vehicles having a rear bed, and consumers use pickup trucks to carry relatively large loads that could not fit in other types of passenger vehicles such as sedans or hatchbacks. A certain consumer market segment prefers smaller vehicles, but some of those consumers would prefer to have a bed with the vehicle and occasionally or even regularly transport large items such as motorcycles, large appliances, building materials, and so forth. Most existing pickup trucks have fairly lengthy beds, on the order of 6 to 8 feet in length, and accommodate relatively large loads. However, such vehicles are sometimes perceived by certain consumers as being too large for their specific needs.

While vehicles can be designed with shorter beds, a shorter bed limits the size of transportable load. Additionally, consumers frequently rely on the tailgate of the vehicle to fold down and act as a loading platform, step, and general support surface such that hundreds of pounds of weight can at times be supported by the open tailgate, and any vehicle design employing a fold-down tailgate or door must support a large amount of weight. Consumers expect the tailgate to maintain on the order of hundreds of pounds of weight, in some instances more than 500 pounds. An automotive vehicle with a short vehicle bed and an open tailgate that cannot support 500 pounds or an object over four or five feet in length will likely have very limited appeal to the general public.

It would therefore be beneficial to provide an automotive vehicle design that offers a relatively short bed in a smaller overall sized vehicle, while at the same time providing a functional tailgate according to customer expectation and an ability to carry relatively large and heavy loads, i.e. loads greater than five feet in length and/or large in comparison to the size of the vehicle bed. It would also be beneficial to provide a vehicle design that addresses consumer desires while at the same time overcoming issues present in previous short vehicle bed designs.

SUMMARY

According to the present design, there is provided an extending tailgate arrangement comprising a tailgate and a linkage configured to extend the tailgate away from a rear end of a vehicle by a predetermined distance such that the tailgate contacts the linkage and does not contact the vehicle.

According to another aspect of the present design, there is provided a vehicle comprising a bed located near a rear of the vehicle, a plurality of vertical side surfaces attached to the bed, a gate, and a plurality of linkages, each linkage connected to one vertical side surface and a side of the gate. Each linkage is configured to extend the gate away from the rear of the vehicle by a predetermined distance such that the gate contacts the linkage and does not contact the rear of the vehicle.

According to a further aspect of the present design, there is provided a tailgate extension apparatus comprising a linkage comprising a plurality of links, wherein multiple links are affixed to a surface of a vehicle, the plurality of links comprising a largest link having dimensions larger than any other link in the linkage, a tailgate extension affixed to multiple links at multiple points, and a tailgate affixed to the tailgate extension. The linkage is configured to move the tailgate between a closed position and an extended open potion wherein the tailgate is separated from the vehicle by a gap of a predetermined distance.

Various aspects and features of the disclosure are described in further detail below.

DETAILED DESCRIPTION

The following description and the drawings illustrate specific embodiments sufficient to enable those skilled in the art to practice the system described. Other embodiments may incorporate structural, logical, process and other changes. Examples merely typify possible variations. Individual components and functions are generally optional unless explicitly required, and the sequence of assembly or operations may vary. Portions and features of some embodiments may be included in or substituted for those of others.

The present design is a vehicle tailgate extension system employing a linkage that provides a tailgate extension that may be employed with vehicles having, for example, relatively small beds, where the tailgate extension extends away from the rear of the vehicle a distance greater than the tailgate would otherwise normally deploy. The present design in one embodiment has two modes, a first "standard" or "conventional" mode where the tailgate folds down by rotating about an axis typically at the bottom or slightly below the tailgate, and an "extended" mode, where the tailgate employs a unique linkage that extends the tailgate a predetermined length or gap away from the vehicle such that relatively large or lengthy loads can be accommodated. The system in certain embodiments provides a shear plate that laterally constrains the tailgate, provides protection for the linkage from cargo, and prevents objects from falling through the gap formed between the extended tailgate and the vehicle. Certain embodiments of the present design further include a fence configured to store within the tailgate, resulting in a compact and efficient design.

While the present design is applicable to short vehicle beds, the design including the linkage discussed herein may be used with a variety of vehicles, including but not limited to standard pickups and other light duty vehicles, station wagons, and/or any other type of vehicle employing a door or surface that folds down. Thus any type of vehicle that can benefit from offering an extended tailgate or door mode may employ the current design. Also, while discussed primarily with respect to a rear end of a vehicle, the present design is not limited to use at a rear of a vehicle, and could, for example, be used at a side of a vehicle in accordance with the teachings herein.

Figure 1:
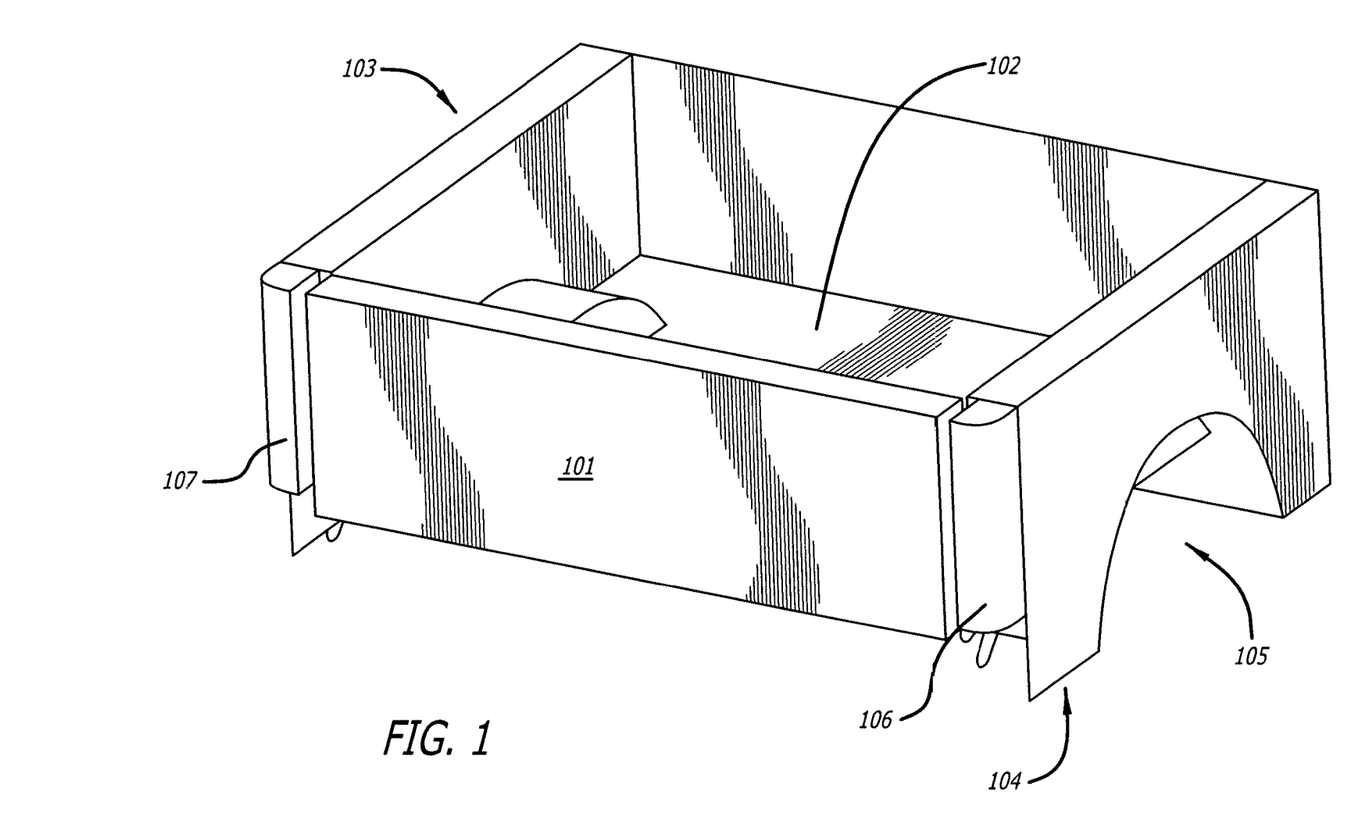
FIG. 1 illustrates a bed design for a smaller vehicle employing the current design.
Figure 2:
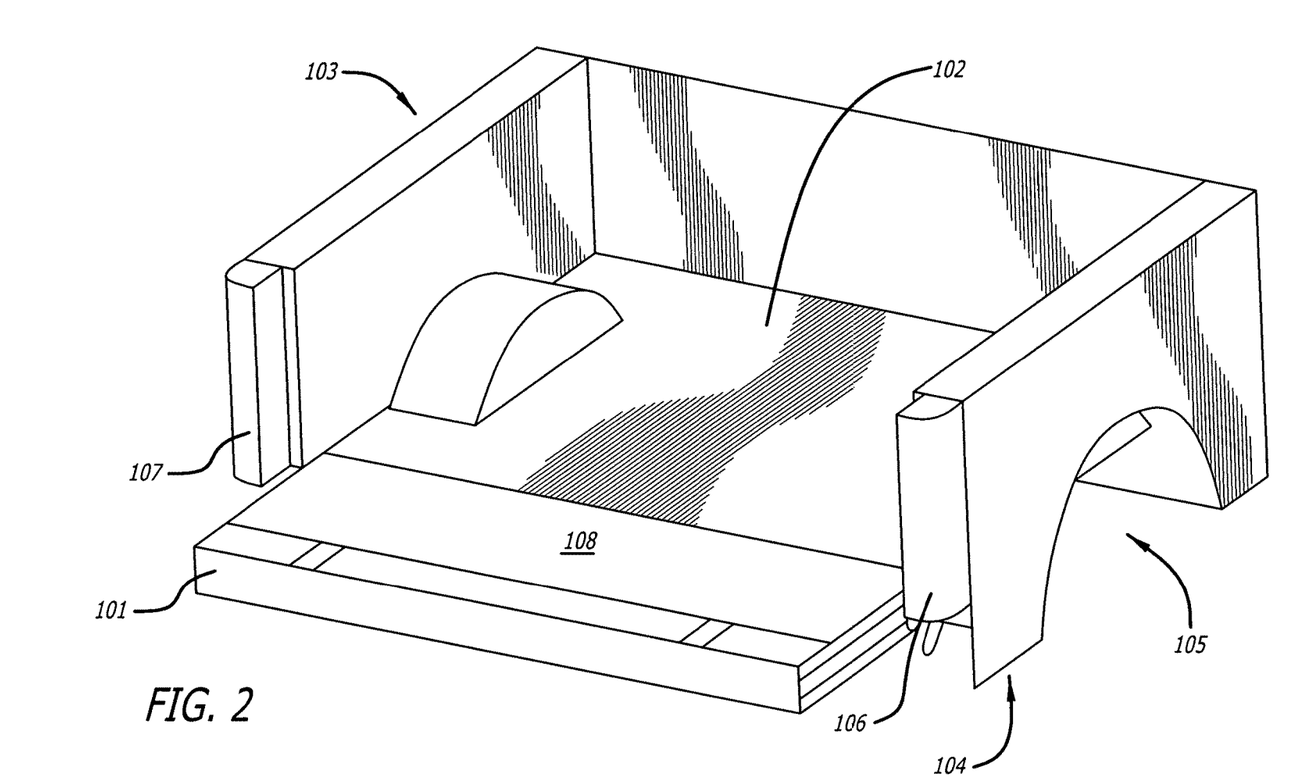
FIG. 2 illustrates the same bed of FIG. 1 with the tailgate folded down, i.e. in an open position.

FIG. 1 illustrates a bed design for a smaller vehicle employing the current design, with FIG. 1 showing a tailgate 101, bed 102, side panels 103 and 104, and in this view a wheel well 105. Also shown in this view are tail lights 106 and 107. FIG. 2 illustrates the same bed 102 with the tailgate 101 folded down, i.e. in an open position, again including side panels 103 and 104 and wheel well 105. The tailgate employs a hinge, enabling the tailgate 101 to pivot about a single axis (not shown in FIG. 1 or FIG. 2) and swing down to a conventional tailgate open position. The present design allows for the tailgate 101 to be folded down without extending, i.e. opened in a conventional hinged manner. In this arrangement, the linkage 301 partially deploys or alternately may be disengaged from the tailgate 101 and the user may activate a conventional tailgate opening sequence, manually such as by pulling a lever or electronic, where the tailgate 101 pivots about an axis on a hinge (not shown) such that it folds down without extension, i.e. adjacent to the bed of the vehicle. Also shown in FIG. 2 is shear plate 108, described in further detail below.

Figure 3:
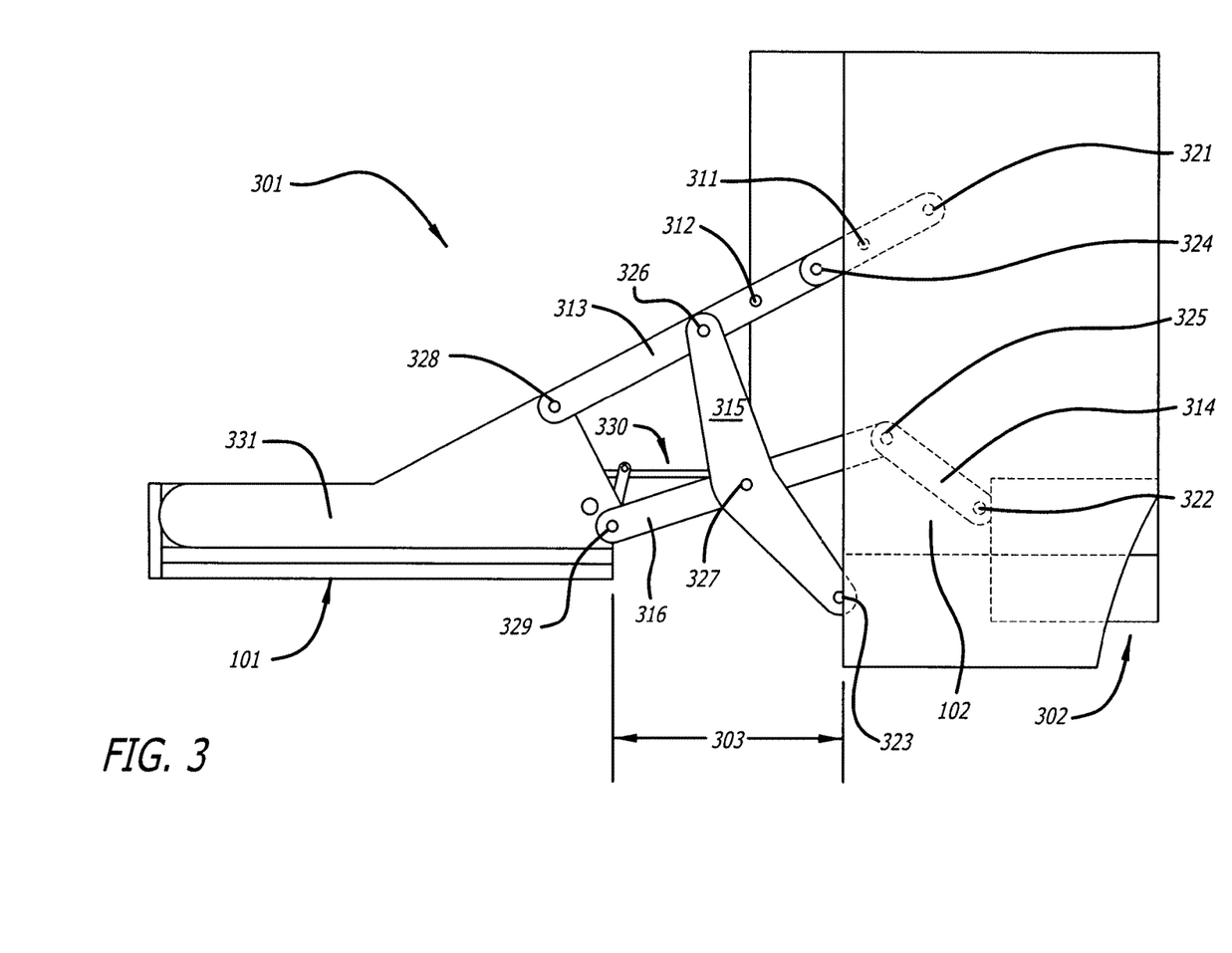
FIG. 3 is a view of the linkage employed according to an embodiment of the present design.

FIG. 3 illustrates a view of the linkage 301 of the present design, with the tailgate in an "open" position with the tailgate 101 extended away from the rear of the bed 102 and a bumper 302 such that a gap 303 is formed between the open tailgate 101 and bed 102. While one linkage is shown, it is to be understood that this linkage is on the passenger side of the vehicle, and a companion identical linkage may be offered in a similar position on the driver's side of the vehicle, or another different linkage may be provided. Additionally, a linkage similar or identical to linkage 304 may be offered on the driver's side and a different linkage on the passenger side.

Linkage 301 includes multiple elements and attachment/rotation points, including first link 311, second link 312, third link 313, large link 314, lower link 315, and extended link 316. These links employ points 321, 322, and 323, adjoined to one vehicle side panel, as well as movable points 324, 325, 326, and 327, and adjoining points 328 and 329 provided to affix to tailgate support member 331, which is attached to tailgate 101. Also illustrated in this FIG. 3 is shear plate 330, adjoined to the bed 303 and in this view extending substantially horizontally to provide a surface above the gap 302 such that objects do not fall through gap 302.

Figure 4A:
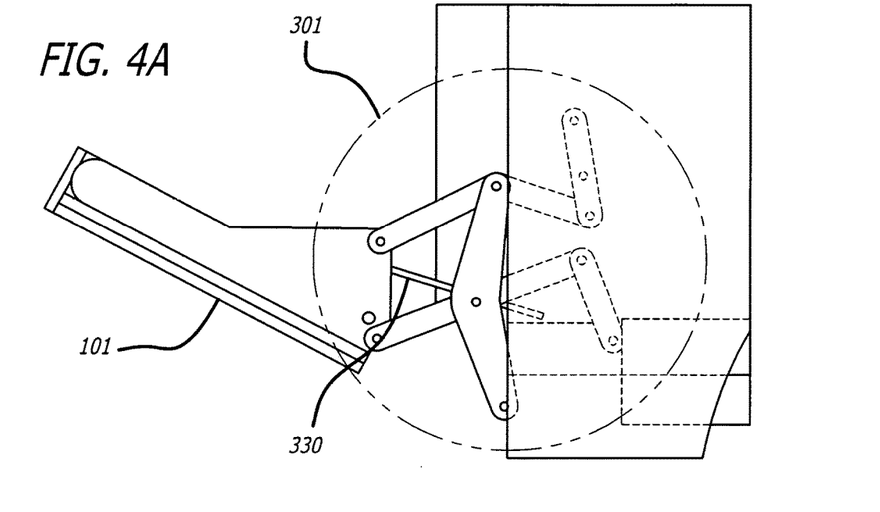
FIGS. 4A and 4B show two intermediate positions of the linkage with the tailgate partially raised.
Figure 4B:
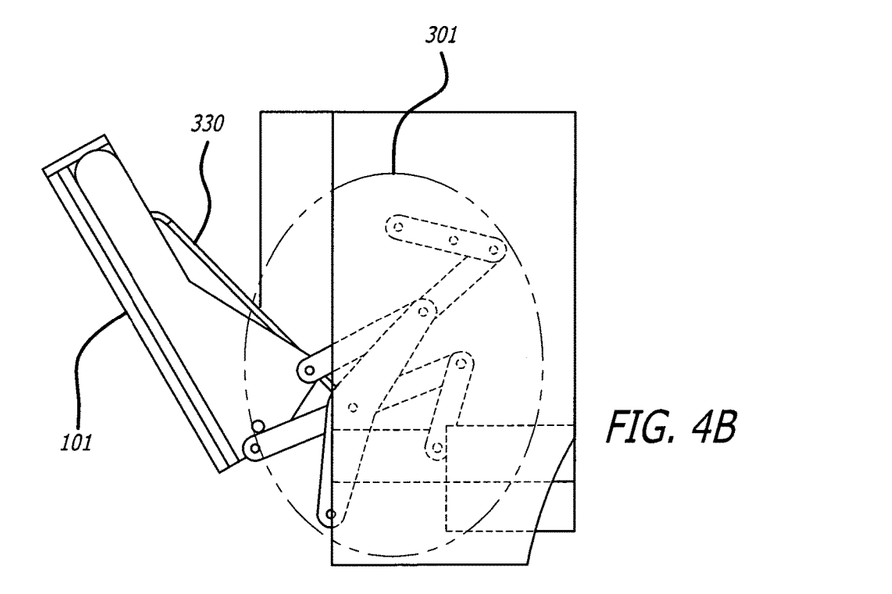

FIGS. 4A and 4B show two intermediate positions of the linkage 301 with the tailgate 101 partially raised, resulting in a number of links in the linkage pivoting and the shear plate 330 rising while sliding along the inside surface of the tailgate 101. Links 311 through 316 are shown in intermediate positions, with points 324 through 327 moving to an intermediate position, points 321, 322, and 323 remaining fixed in position with respect to the vehicle and points 328 and 329 affixed to tailgate support member 331.

Figure 5:
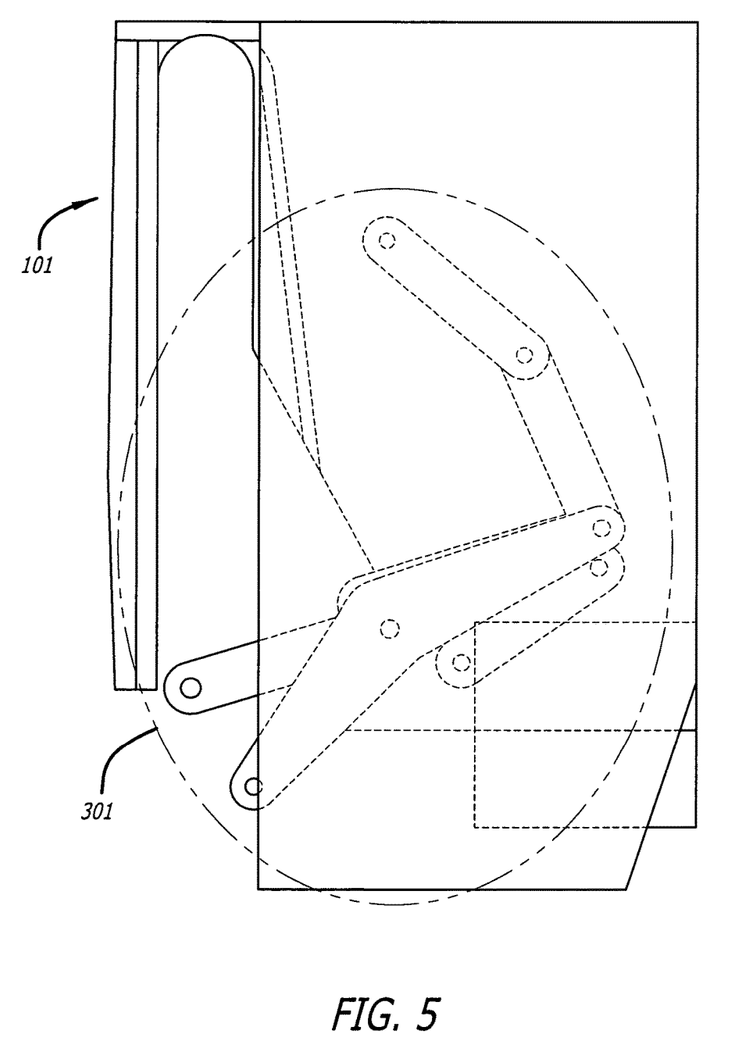
FIG. 5 illustrates the tailgate in a closed position.

FIG. 5 shows the tailgate in closed position, with linkage 301 retracted and some links at least partially obscured in this view. Shear plate 330 is raised flush with the inside of tailgate 101. FIGS. 3-5 thus represent one embodiment of the present design, an embodiment wherein a linkage comprising a number of links enables a tailgate to achieve a position extended from the rear of the bed and the rear of the bumper by a distance, such as the gap 303 shown in FIG. 3. The tailgate will preferably have an ability to support hundreds of pounds, such as over 500 pounds or on the order of 700 or 750 pounds. The linkages are formed of metal, such as steel, to a degree and thickness that will support such a load when the design is in the orientation shown in FIG. 3. Adequate joints or points are also provided, such as pins able to rotate and support the necessary weight in the FIG. 3 orientation.

In general, FIGS. 3-5 show a configuration wherein multiple links are provided that when extended, as shown in FIG. 3, the links are linearly aligned and support a significant load, i.e. links 311, 312, and 313 are substantially in a line and adjoin tailgate support member 331. Links 311, 312, and 313, serve to draw the tailgate support member 331 and specifically one adjoining point on tailgate support member 331 to an appropriate position relative to the bed, while the other links operate to both support the three links 311, 312, and 313 when the tailgate is in the lowered position as well as draw the other adjoining point on tailgate support member 331 to an appropriate position relative to the bed 102. Movement of tailgate support member 331 in the embodiments of FIGS. 3-5 is of primary importance with respect to design of linkage 301, and linkage 301 is sized, configured and positioned to maintain the tailgate in both a fully closed and the fully extended orientation. In general, in embodiments presented herein, the linkage is dimensioned to be relatively compact and not occupy much space in the width or thickness dimension, allowing the linkage to fit within in the side panels 103 and 104. Thus while certain link parameters and dimensions may be changed, movement of the tailgate in the manner shown is the objective of the linkage design.

Figure 6:
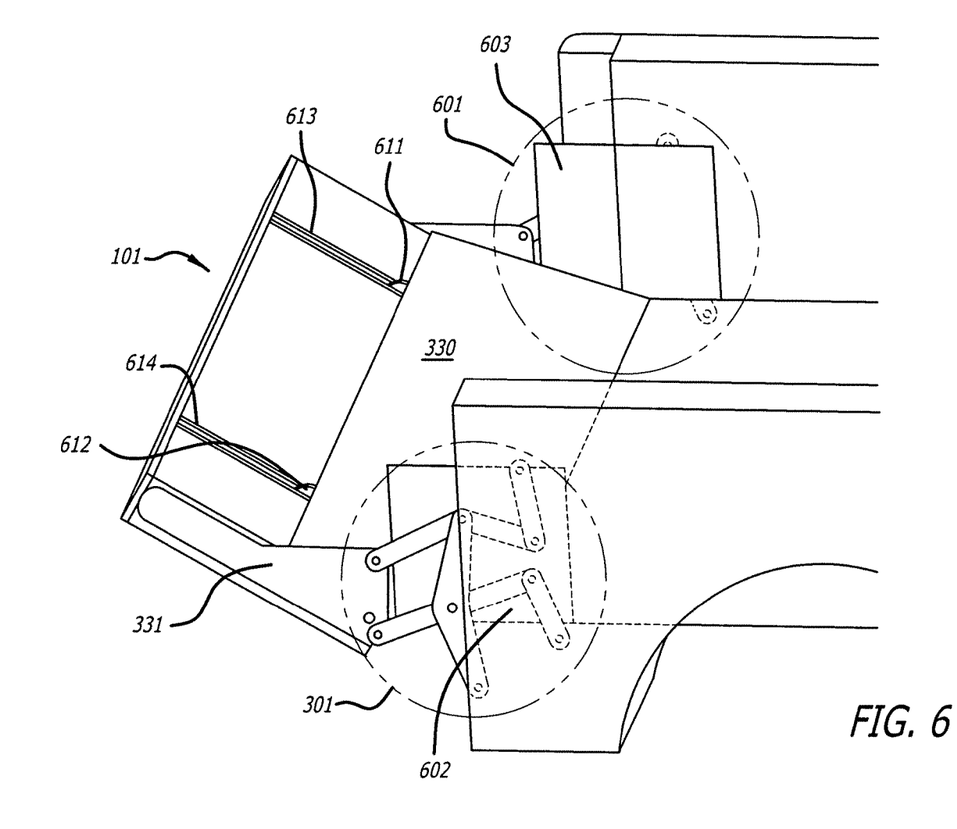
FIG. 6 is a perspective view of the rear of the vehicle and bed, showing the linkage affixed to the vehicle side panel.
Figure 7:
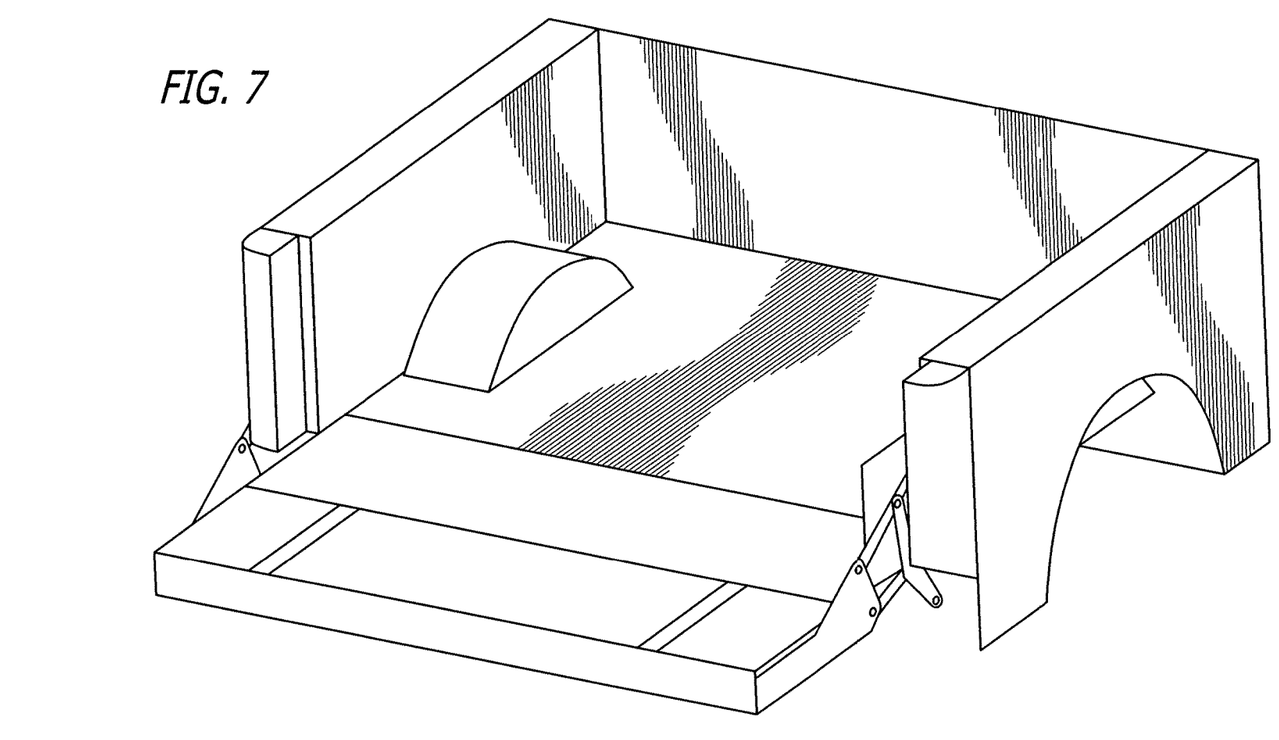
FIG. 7 represents an alternate perspective view of the extended tailgate using the linkage described herein.

FIG. 6 illustrates a perspective view of the rear of the vehicle and bed, with linkage 301 illustrated affixed to the vehicle side panel 104. A companion linkage 601 is obscured in this view but is similar or identical to the linkage 301 shown. Tailgate support member 331 is shown affixed to tailgate 101, and shear plate 330 is also illustrated in this perspective view. Two sliding covers 602 and 603 are shown, with the function of sliding covers 602 and 603 to protect the linkage from cargo. Sliding covers 602 and 603 may slide out manually or may be affixed to the linkage or use a separate linkage to deploy and retract, and may take different forms or shapes than those depicted. Sliding covers 602 and 603 may be constructed of any appropriate material, including but not limited to metal or plastic or some combination thereof. FIG. 7 represents an alternate perspective view of the extended tailgate using the linkage described herein.

From FIG. 6, shear plate 330 is provided with two sliding connections 611 and 612 that in this embodiment slide in channels 613 and 614. Shear plate 330 provides two main functions, first blocking the gap formed when the tailgate 101 is open and extended such that objects do not fall into the gap, and second to constrain the tailgate laterally and provide a certain level of stability when unfolding and when the tailgate is open in the extended configuration.

Figure 8A:
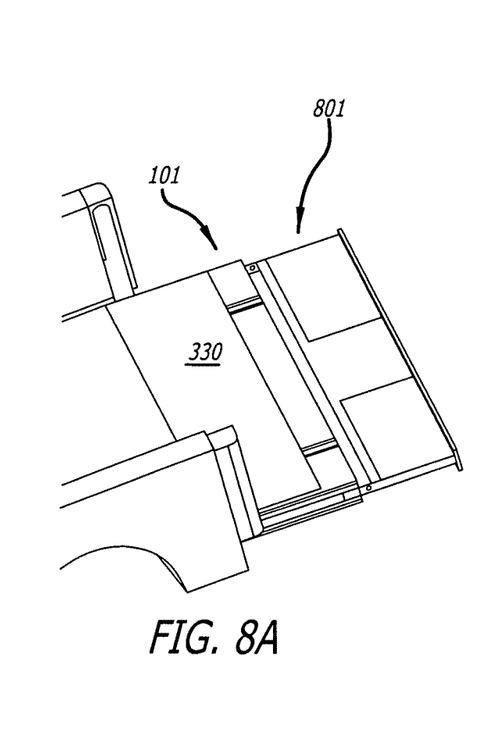
FIGS. 8A, 8B, and 8C illustrate conventional tailgate opening using a fence, with the tailgate flipped down by rotating about an axis parallel to the lower edge of the tailgate and a fence removable from within the tailgate and openable to enclose the area formed.
Figure 8B:
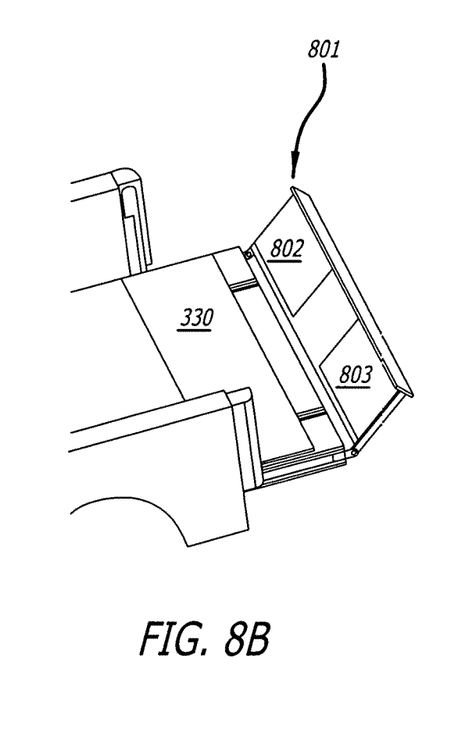
Figure 8C:
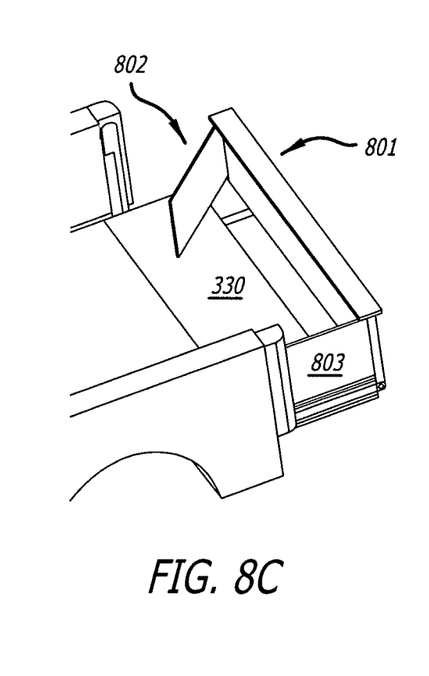

A further feature of the present design is a fence, the fence preferably stored within the tailgate 101 when not deployed. FIG. 1 may be considered a closed version of the tailgate that either employs or does not employ the fence according to the present embodiment. FIGS. 8A to 8C illustrate the conventional tailgate opening and the use of the fence, i.e. the tailgate flipped down by rotating about an axis parallel to the lower edge of the tailgate and not employing the extended mode. Such conventional operation may involve disengaging the linkage from the tailgate 101, such as by disengaging the tailgate support member 331 from the tailgate 101 or by otherwise not employing the linkage 301.

FIG. 8A shows the tailgate in a deployed orientation with a fence 801 configured to slide out of and away from tailgate 101, such as along rails or tracks. FIG. 8B shows the fence pivoting upward, joined at two points to the tailgate 101 and pivoting about an axis between the two points and eventually locking into position. FIG. 8C shows a first side fence panel 802 and a second side fence panel 803 that swing outward into position and provide a configuration such as that shown in FIG. 8C, where the fence side panels overlap, in this embodiment, sliding covers 804 and 805 extending out from the vehicle side panels.

Figure 9A:
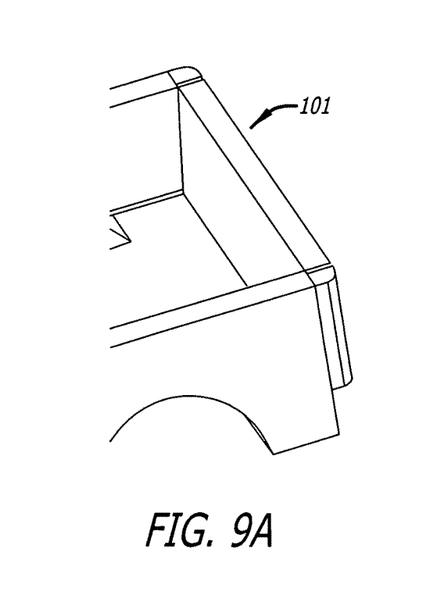
FIGS. 9A, 9B, and 9C show an alternate use of the fence, specifically use of the fence in conjunction with the extended tailgate.
Figure 9B:
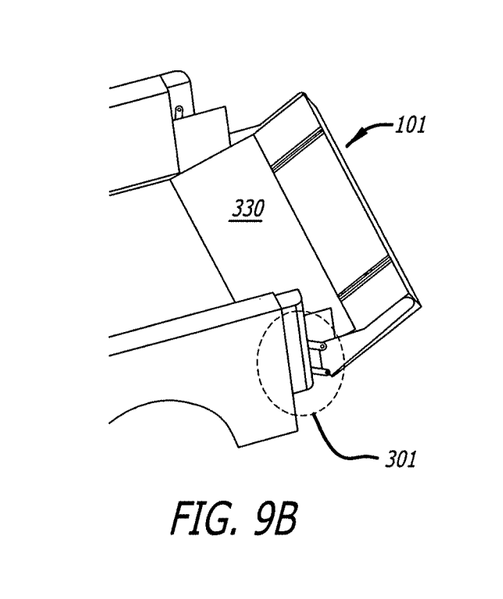
Figure 9C:
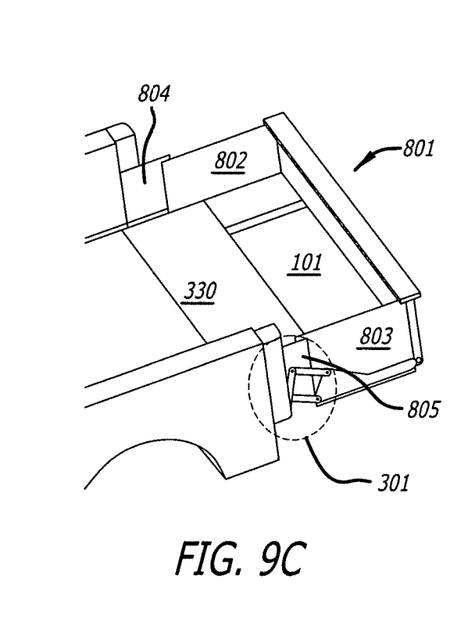

FIGS. 9A, 9B, and 9C show an alternate use of the fence, specifically use of the fence in conjunction with the extended tailgate. The tailgate 101 is lowered using linkage 301 to the extended position as shown in FIG. 9A, and the fence 901 is removed from tailgate 101. The tailgate 101 swings downward to the extended position as shown in FIG. 9B. When completely folded down or extended, the fence is pulled from inside tailgate 101 as shown in FIGS. 8A and 8B. FIG. 9C, fence 801 is shown, with the first fence side panel 802 and second fence side panel 803 are unfolded and put into place as shown, adjoining sliding covers 804 and 805. Sliding covers 804 and 805 deploy from the side panels of the vehicle, either manually, automatically by movement from the linkage, or electrically.

Figure 10:
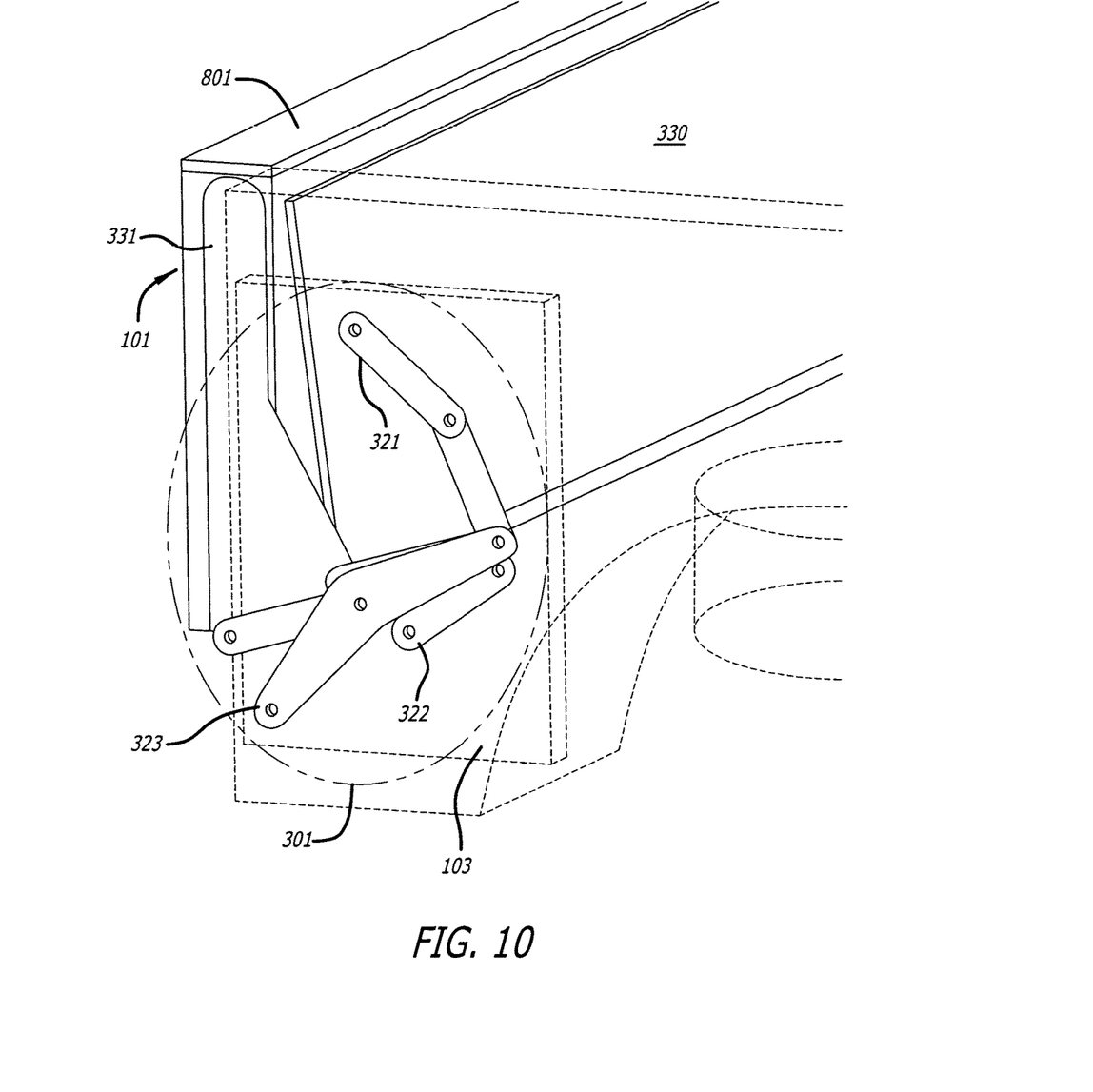
FIG. 10 is an alternate view of the linkage.

FIG. 10 is an alternate view of linkage 301. From FIG. 10, the linkage is affixed to the inner wall or inner surface of the side panel 103, affixed at three points 321, 322, and 323. In one embodiment, the collapsed linkage 301 has dimensions of approximately 400 to 500 mm high, 300 to 400 mm wide, and 40 to 50 mm thick, but different dimensions may be employed. Tailgate support member 331 is partially shown in FIG. 9, but may take different forms as long as it is adjoined to and maintains tailgate 101 in both the closed and open/extended position.

Figure 11:
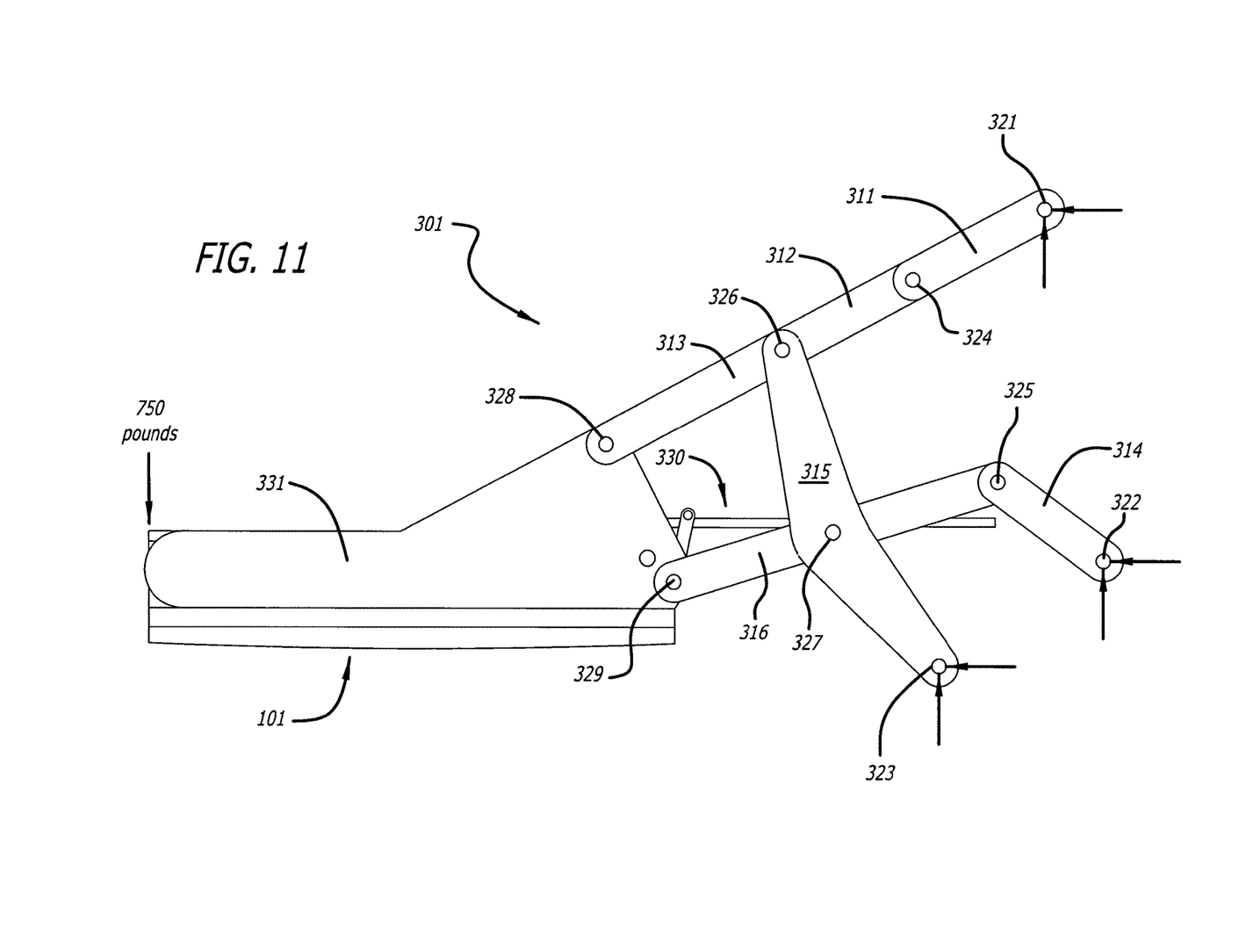
FIG. 11 is a side view of the linkage without the vehicle components, illustrating an application of 750 pounds to the end of the tailgate farthest from the vehicle.

FIG. 11 is a side view of the linkage 301, tailgate support member 331, and the tailgate 101 without other parts or pieces of the vehicle. FIG. 11 serves to demonstrate the loads that may be encountered in use of the linkage 301. Large link 314 is subjected to the highest stress in this embodiment, and thus the dimensions of large link 314 are greater than the other links in this embodiment. It is believed that under maximum load, large link 314 will be subject to in the range of 24,000 psi, and thus the link is on the order of three inches in cross section and a thickness of 3/16 inch, but typically at least 3/16 and possibly 1/4 inch. Again, other dimensions may be employed.

FIG. 11 also illustrates application of 750 pounds of load substantially aft of, i.e. away from, the vehicle, with linkage 301 fully extended and the tailgate in the extended orientation. Weight applied at the corner shown, i.e. 750 pounds at the far aft point and the passenger side edge of the tailgate 101, provides stress to points 321, 322, and 323 in accordance with the values in Table 1. It is noted that the present design may accommodate up to or more than 750 pounds, and slight changes to the design, such as employing links having increased thickness, may support greater weights, including 1000 pounds or more. Thus while FIG. 11 and the discussion of FIG. 11 mentions 750 pounds, the present design may support a larger load, such as one in excess of at least 750 pounds, and may of course support a smaller load. Large arrows in FIG. 11 proximate points 321, 322, and 323 represent X and Y forces, and X forces, Y forces, and resultant forces from the example 750 pound load are provided in Table 1.

TABLE 1

Reaction forces due to 750 pound load as shown in FIG. 11

| Node | X-Force | Y-Force | Resultant Force |
| --- | --- | --- | --- |
| Point 321 | (−)1557 pounds | 268 pounds | 1580 pounds |
| Point 322 | 257 pounds | (−)185 pounds | 317 pounds |
| Point 323 | 1300 pounds | 666 pounds | 1460 pounds |

Figure 12A:
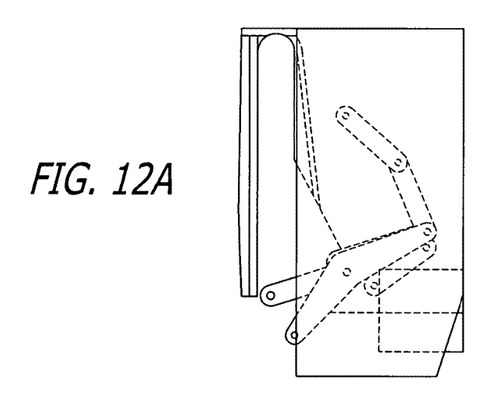
FIGS. 12A, 12B, 12C, and 12D illustrate four positions of the extending gate, including a closed position, two intermediate positions, and an open or extended position.
Figure 12B:
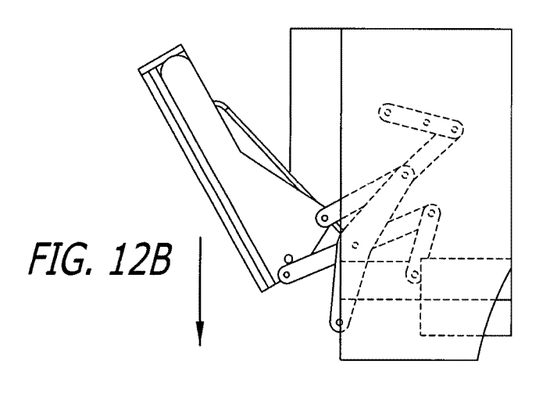
Figure 12C:
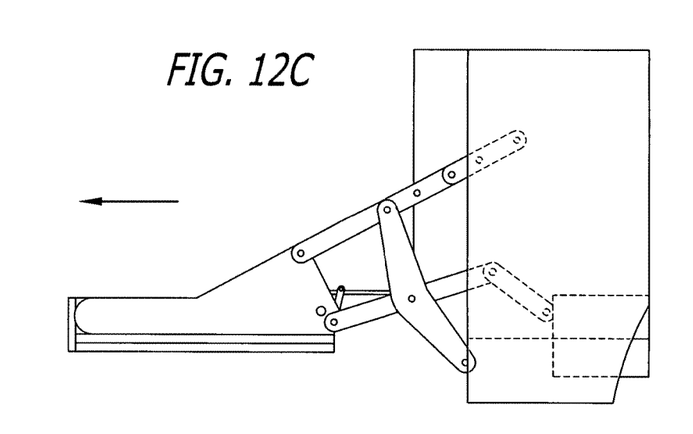
Figure 12D:
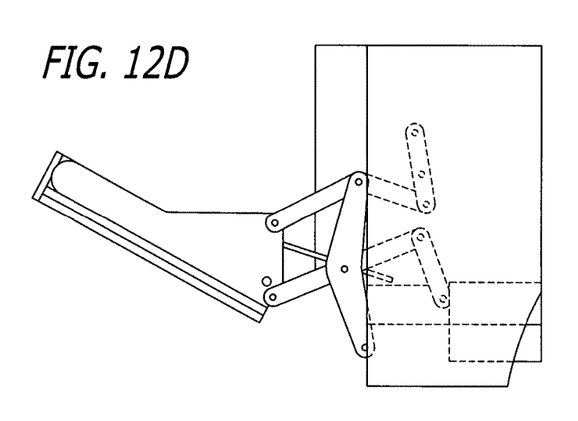

FIGS. 12A through 12D illustrate four positions of the extending gate, with FIG. 12A representing the closed tailgate position, FIG. 12B the slightly open position, FIG. 12C the substantially open position, and FIG. 12D completely open. Fixed points shown as points 321, 322, and 323 are shown with X marks in FIGS. 12A through 12D, and as noted provide engagement between linkage 301 and an inner wall of the vehicle bed in this embodiment.

While described herein with respect to a vehicle with a bed, such as a pickup truck, it is to be understood that the present design may be employed in any type vehicle wherein a door or vehicle part is to be extended a distance away from the vehicle, separated by a predetermined distance or gap from the vehicle. The present design may be used as a side gate on a van or bus or in another configuration on any other type of vehicle. Additionally, while the present design includes a tailgate support member and the tailgate support member has generally been discussed in a manner suggesting the tailgate support member is separate from the linkage, the linkage may be considered to include the tailgate support member, and the language employed in the present description and in the claims are intended to be interpreted as broadly as possible.

Thus according to the present design, there is provided an extending tailgate arrangement comprising a tailgate and a linkage configured to extend the tailgate away from a rear end of a vehicle by a predetermined distance such that the tailgate contacts the linkage and does not contact the vehicle.

According to another aspect of the present design, there is provided a vehicle comprising a bed located near a rear of the vehicle, a plurality of vertical side surfaces attached to the bed, a gate, and a plurality of linkages, each linkage connected to one vertical side surface and a side of the gate. Each linkage is configured to extend the gate away from the rear of the vehicle by a predetermined distance such that the gate contacts the linkage and does not contact the rear of the vehicle.

According to a further aspect of the present design, there is provided a tailgate extension apparatus comprising a linkage comprising a plurality of links, wherein multiple links are affixed to a surface of a vehicle, the plurality of links comprising a largest link having dimensions larger than any other link in the linkage, a tailgate extension affixed to multiple links at multiple points, and a tailgate affixed to the tailgate extension. The linkage is configured to move the tailgate between a closed position and an extended open potion wherein the tailgate is separated from the vehicle by a gap of a predetermined distance.

The previous description of the disclosure is provided to enable any person skilled in the art to make or use the disclosure. Various modifications to the disclosure will be readily apparent to those skilled in the art, and the generic principles defined herein may be applied to other variations without departing from the scope of the disclosure. Thus, the disclosure is not intended to be limited to the examples and designs described herein but is to be accorded the widest scope consistent with the principles and novel features disclosed herein.

What is claimed is:

1. An extending tailgate arrangement comprising:
   a tailgate; and
   a linkage configured to extend the tailgate away from a rear end of a vehicle by a predetermined distance such that the tailgate contacts the linkage and does not contact the vehicle;
   wherein the linkage is attached to the vehicle at at least three points and comprises a largest link having length and width dimensions larger than any other link in the linkage, and the largest link is attached to the vehicle and at least two other links in the linkage.

2. The extending tailgate arrangement of claim 1, wherein the linkage comprises a plurality of links affixed to a side panel of the vehicle.

3. The extending tailgate arrangement of claim 1, further comprising a tailgate support member affixable to the tailgate and affixed to the linkage.

4. The extending tailgate arrangement of claim 1, further comprising an additional linkage, wherein the linkage contacts a side of the tailgate and the further linkage contacts an opposite side of the tailgate.

5. The extending tailgate arrangement of claim 1, wherein the linkage is configured to support a force in excess of at least 750 pounds at a rear end of the tailgate when extended.

6. The extending tailgate arrangement of claim 2, wherein a plurality of links in the linkage directly contact the side panel of the vehicle.

7. The extending tailgate arrangement of claim 1, wherein the tailgate is configured to operate in a conventional mode wherein the tailgate rotates about an axis parallel to the tailgate, the axis below the middle of the tailgate, wherein in the conventional mode when the tailgate is opened no gap of the predetermined distance is formed and the tailgate contacts the vehicle.

8. The extending tailgate arrangement of claim 1, further comprising a plate that slidably interacts with the tailgate such that the plate covers a gap formed when the tailgate is extended.

9. The extending tailgate arrangement of claim 1, further comprising a fence housable within the tailgate, wherein when deployed the fence encloses an area formed by the extended tailgate.

10. The extending tailgate arrangement of claim 2, further comprising a sliding panel extending from the side panel and protecting the linkage from damage.

11. A vehicle comprising:
    a bed located near a rear of the vehicle;
    a plurality of vertical side surfaces attached to the bed;
    a gate; and
    a plurality of linkages, each linkage connected to one vertical side surface and a side of the gate, wherein each linkage is attached to the vehicle at at least three points and comprises a largest link having length and width dimensions larger than any other link in the linkage, and the largest link is attached to the vehicle and at least two other links in the linkage;
    wherein each linkage is configured to extend the gate away from the rear of the vehicle by a predetermined distance such that the gate contacts each linkage and does not contact the rear of the vehicle.

12. The vehicle of claim 11, further comprising a gate support member affixable to the gate and affixed to one linkage.

13. The vehicle of claim 11, wherein each linkage is configured to support a force in excess of at least 750 pounds at a rear end of the gate when extended.

14. The vehicle of claim 13, wherein a plurality of links in each linkage directly contact one vertical side surface of the vehicle.

15. The vehicle of claim 11, wherein the gate is configured to operate in a conventional mode wherein the gate rotates about an axis parallel to the gate, the axis below the middle of the gate, wherein in the conventional mode when the gate is opened no gap of the predetermined distance is formed and the gate contacts the vehicle.

16. The vehicle of claim 11, further comprising a plate that slidably interacts with the gate such that the plate covers a gap formed when the gate is extended.

17. The vehicle of claim 11, further comprising a fence housable within the gate, wherein when deployed the fence encloses an area formed by the extended gate.

18. The extending tailgate arrangement of claim 11, further comprising a sliding panel extending from one vertical side surface and protecting one linkage from damage.

19. A tailgate extension apparatus, comprising:
    a linkage comprising a plurality of links, wherein multiple links are affixed to a surface of a vehicle, the plurality of links comprising a largest link having dimensions larger than any other link in the linkage;
    a tailgate extension affixed to multiple links at multiple points; and
    a tailgate affixed to the tailgate extension;
    wherein the linkage is configured to move the tailgate between a closed position and an extended open potion wherein the tailgate is separated from the vehicle by a gap of a predetermined distance.

20. The tailgate extension apparatus of claim 19, wherein the linkage is configured to support a force in excess of at least 750 pounds at a rear end of the tailgate when extended.

21. The tailgate extension apparatus of claim 19, wherein the tailgate is configured to operate in a conventional mode wherein the tailgate rotates about an axis parallel to the tailgate, the axis below the middle of the tailgate, wherein in the conventional mode when the tailgate is opened no gap of the predetermined distance is formed and the tailgate contacts the vehicle.

22. The tailgate extension apparatus of claim 19, further comprising a plate that slidably interacts with the tailgate such that the plate covers a gap formed when the tailgate is extended.

23. The tailgate extension apparatus of claim 19, further comprising a fence housable within the tailgate, wherein when deployed the fence encloses an area formed by the extended tailgate.

24. The tailgate extension apparatus of claim 19, further comprising a sliding panel extending from the surface and protecting the linkage from damage.

\* \* \* \* \*